Sept. 11, 1962 F. GRESTY 3,053,044
HYDRAULIC TRANSMISSION SYSTEMS
Filed Oct. 12, 1959 3 Sheets-Sheet 2

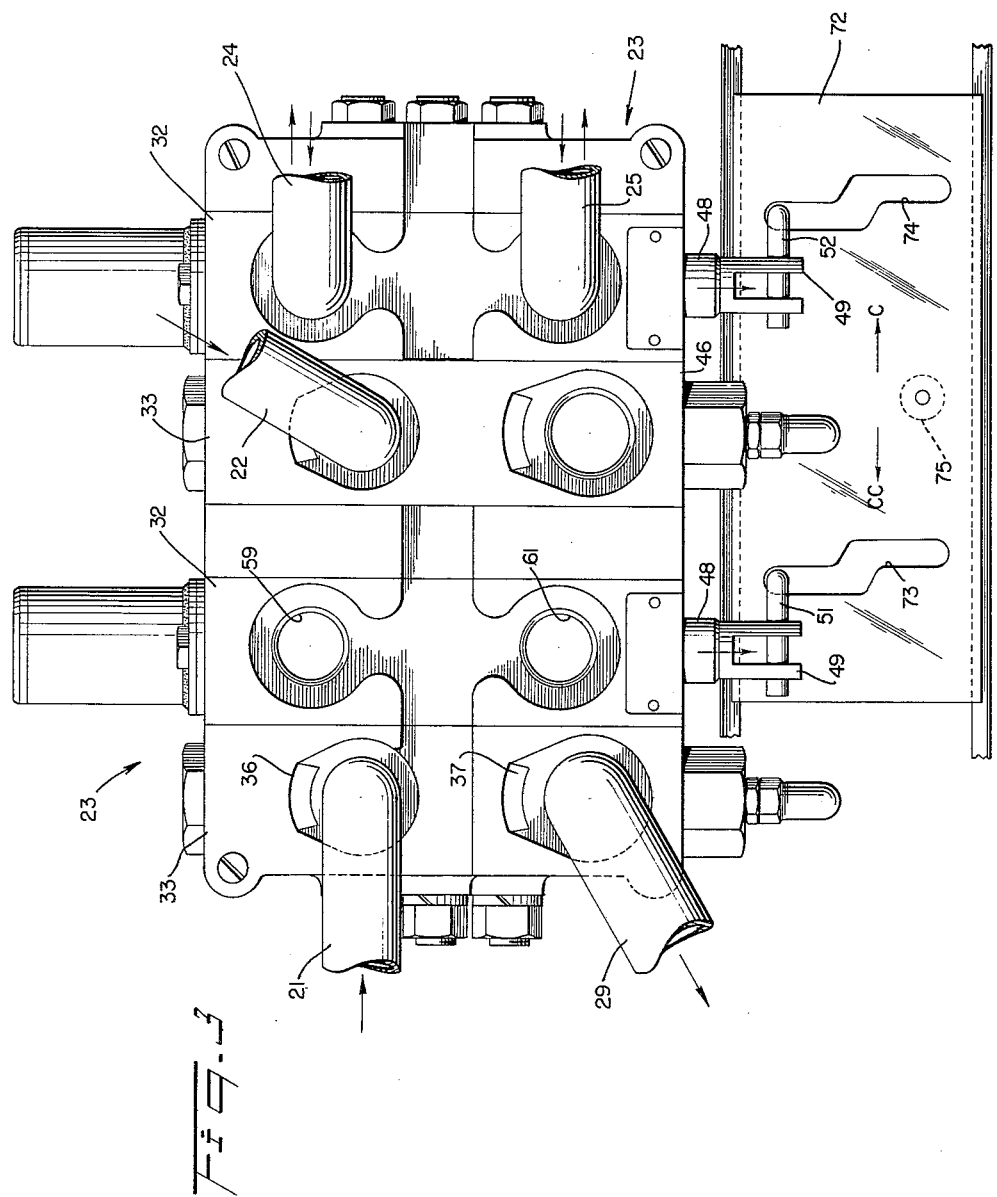

United States Patent Office 3,053,044
Patented Sept. 11, 1962

3,053,044
HYDRAULIC TRANSMISSION SYSTEMS
Fred Gresty, London, England, assignor to Ready Mixed Concrete Limited, London, England, a corporation of Great Britain
Filed Oct. 12, 1959, Ser. No. 845,699
Claims priority, application Great Britain Nov. 7, 1958
5 Claims. (Cl. 60—19)

This invention relates to hydraulic transmission systems in motor vehicles for driving auxiliary equipment.

Auxiliary motors may be arranged in the systems to drive a wide variety of equipment such as pumps, refrigerating compressors, rotary mixing drums, and so forth.

The general object of the present invention is to provide improved hydraulic transmission systems for the purposes referred to.

An hydraulic transmission system, according to the invention, therefore comprises two separate hydraulic pumps driven respectively from any two of the following power take-offs; the crank shaft, the engine fly wheel, and the gear box. The pumps are connected to a reservoir and through a common control valve to an hydraulic motor for driving the auxiliary equipment. Ordinarily the pumps will be situated at opposite ends of the vehicle engine which is advantageous compared with the location of the pumps in tandem at either the front or the rear of the vehicle engine. The former arrangement increases the front chassis overhang to an undersirable extent, and the latter arrangement renders both pumps inaccessible for maintenance and repair, and where coupled to the gear box making gear changing in the ordinary way extremely difficult because of the clutch drag caused by the pumps' inertia on the transmission.

Other objects and a fuller understanding of the invention may be had by referring to the following description and claims, in which:

FIGURE 3 is a diagrammatic front elevation of the control and relief valve showing the pipe connections of FIGURE 1 and the control interlock.

Figure 1:
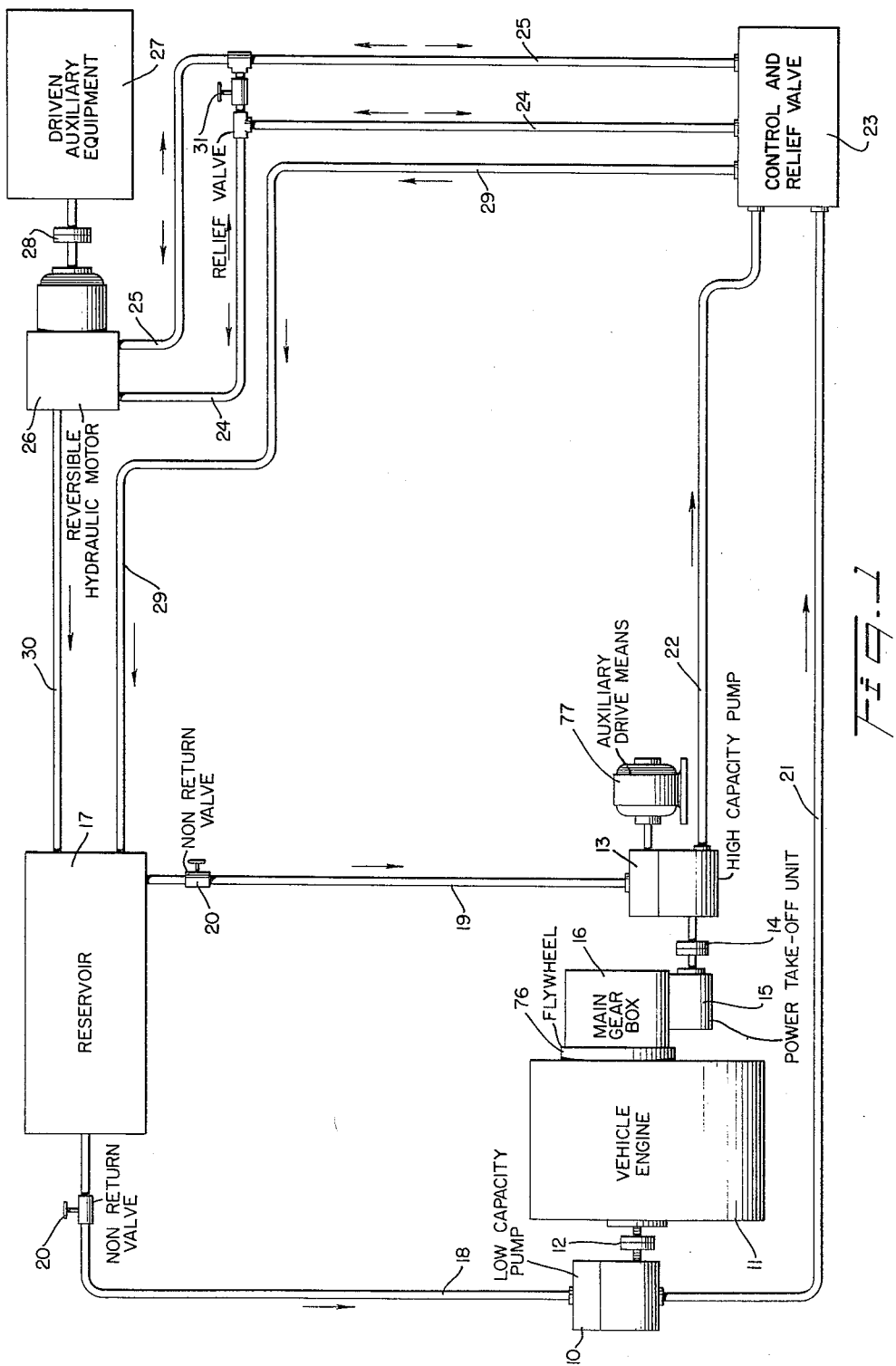
FIGURE 1 is a schematic sketch of the hydraulic transmission systems according to the invention.

Referring to FIG. 1, the hydraulic transmission system comprises a low capacity hydraulic pump 10, mounted in front of the vehicle engine 11, to which the pump is connected by a flexible clutch coupling 12. A higher capacity hydraulic pump 13 is coupled directly by a stud shaft or flexible clutch coupling 14, to the power take-off 15, of the main gear box 16 at the rear of the engine 11. The inlet of each pump is connected with a common fluid reservoir 17, by pipes 18 and 19, a non-return valve 20 being connected in each supply line. The outlets from the pumps are connected by pipes 21 and 22 respectively to a common control and relief valve 23.

Feed pipe 24 and a return pipe 25 connect the control and relief valve 23 to an hydraulic motor 26 for driving auxiliary equipment 27 through a coupling 28. A return pipe 29 extends from the control and relief valve 23 to the reservoir 17, and a drain pipe 30 extends from the hydraulic motor 26 to the reservoir 17. A cross-line relief valve 31 is interposed between the control valve 23 and the motor 26 connecting the pipes 24 and 25 to act as a safeguard against surge pressures that could burst the pipes.

The control valve 23 thus accepts fluid from either and both of the pumps 10 and 13 in varying amounts but similar pressures and directs the fluid to the hydraulic motor as required. Where no fluid is required to be passed, an intermediate position permits the fluid to bypass the motor and flow directly to the reservoir 17 through pipe 29.

The speed of the hydraulic motor is adjusted through the control valve 23 which in addition to the intermediate position referred to may assume other positions yielding low, medium and high speeds.

In low speed position the output of the lower capacity pump 10 is supplied to the motor, medium speed corresponds to the output of the high capacity pump 13 only, and high speed results from the combined output of both pumps.

Figure 2:
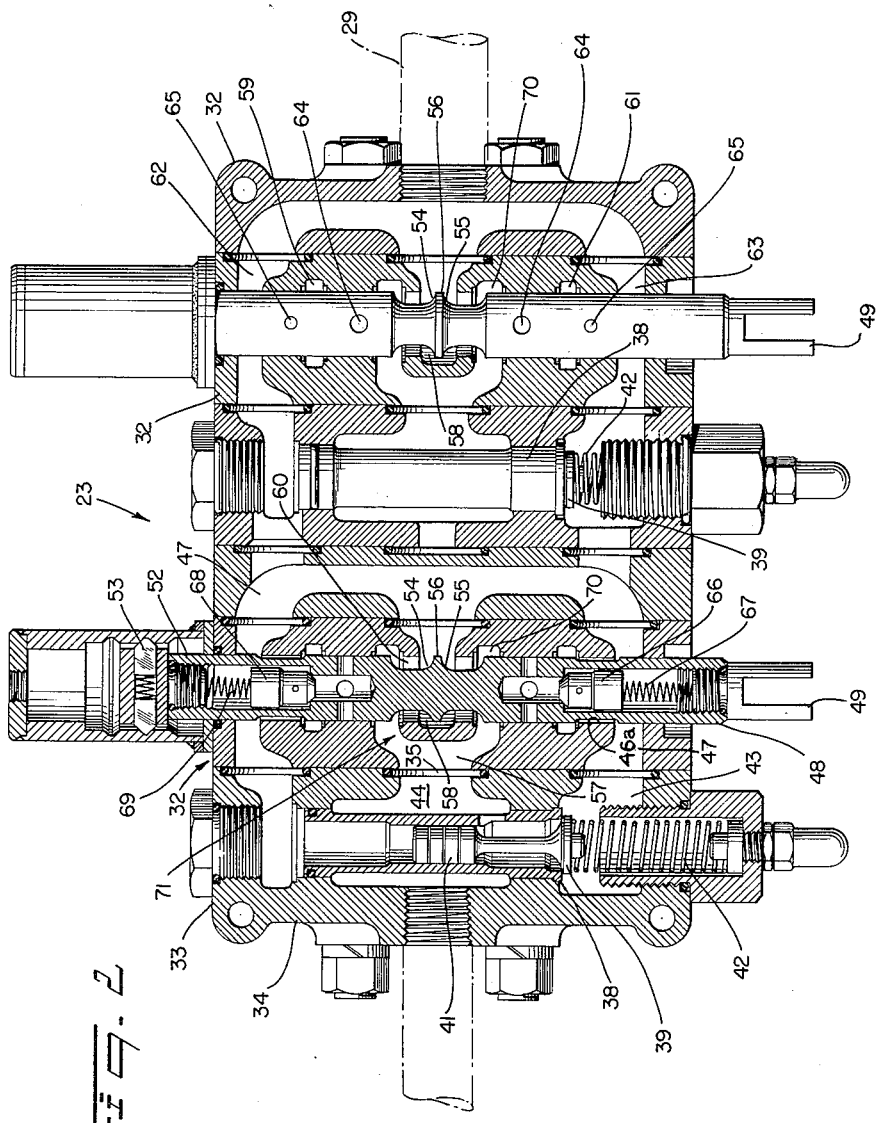
FIGURE 2 is a diagrammatic front elevation cross-sectional view of the control and relief valve.

Referring to FIGURES 2 and 3, the control valve 23 comprises an assembly of a control valve 32 for each of the pumps, and a relief valve 33 for each of the control valves 32. As the control valves and the relief valves are similar only an associated set comprising one of each will be described.

The relief valve 33 comprises a body 34 having an inlet 36 and outlets 35 and 37 respectively above and below a valve seat 38 and a valve end 39 of a valve plunger 41. The valve end 39 is held seated by a valve spring 42 in adjustable compression. When the fluid pressure above the valve seat 38 exceeds the spring pressure keeping the valve end 39 seated, the valve opens and allows the fluid to flow directly through a passage 43 to the outlet 37 which is connected to the reservoir 17 by pipe 29. When the spring pressure exceeds the fluid pressure the fluid flows through passage 44 to the outlet 35 and to the adjacent control valve 32.

The control valve 32 comprises a body 46 defining an interior cylinder 46a, the ends and middle of which are connected by an internal passage 47 that is congruent with the passage 43 of the relief valve 33. A double-acting, hollow ended plunger 48 having a diameter to fit the cylinder 46a is slidably mounted in the cylinder. Both ends of the plunger 48 extend beyond the cylinder, a forked end 49 is pierced to connect with a control rod 51, and the other end 52 terminates in a poppet detent arrangement 53 that limits the movement of the plunger 48 in the cylinder to an advanced position, a retracted position and an intermediate position. In its middle portion the plunger 48 has recesses 54 and 55, and between the recesses, a piston-like part 56. In the body 46, a center inlet 57 is congruent with the passage 44 and the outlet 35 of the associated relief valve 33 at one end and at the other forks above and below the part 56 and the center section 58 of the interior passage 47. The forked passages 70 and 71 of the inlet 57 are connected with the center section 58 of the passage 47 by the upper and lower sections 60 of the cylinder defined by the body 46. The part 56 is adapted to close the upper or lower cylinder sections 60 alternatively, and thus seal the top and bottom forks selectively of inlet 57, from the center section 58, or, in cooperation with the recesses 54 and 55, to leave both forks connected to the center section 58 when the plunger 48 is in centered position. The body 46 also has internal passages 59 and 61 intermediate the center section 58 and the upper and lower sections 62 and 63 respectively of passage 47.

The hollow ends of valve plunger 48 each have radial inner and outer openings 64 and 65 respectively, which are axially spaced to connect opening 59 to the upper passage 62 at the upper end of the plunger 58 and to connect opening 61 to the lower fork 70 at the other end of the plunger when the plunger is in its advanced position. With the plunger 48 in its retracted position the inner and outer openings 64 and 65 connect the passage 61 with the lower section 63 at the lower end of the plunger, and the passage 59 to the upper fork 71 at the other end of the plunger. Spring seated check valves 66 and 68 are positioned in the lower and upper hollow ends of the plunger 48. The check valves 66 and 68 are opened by the admitted fluid pressure against the pressure of springs 67 and 69. When part 56 of the plunger 48 is intermediate its advanced and retracted positions the inner and outer openings 64 and 65 do not connect any of the passages.

In operation each set of relief and control valves is connected to a pump. Since both sets operate similarly, only one will be described. Fluid from pump 10 is admitted through pipe 21 to the relief valve 33 on the left in FIGURE 1 by way of inlet 36. If the fluid is over pressure it is vented back to the reservoir 17 through the valve end 39 and valve seat 38, passage 43, outlet 37 and pipe 29. Otherwise the fluid travels through passage 44 and outlet 35 into passage 57 of the control valve 32. As shown in FIGURE 2, the plunger 48 is in the intermediate position. In this position the fluid flows into the horizontal forked passages 70 and 71 and into upper and lower vertical passages 60 then into horizontal center section 58 and back to the reservoir 17 through the outlet 37 and the connecting pipe 29.

When the plunger 48 is moved upwardly from the centered position shown in FIG. 2 into the advanced position, the fluid flow from the upper fork 71 is blocked by the part 56. Pressure fluid flows in the lower fork 70 through the lower plunger opening 64 which the upward movement of the plunger brought into line with the lower fork, and out of the lower plunger opening 65 into the opening 61 now in line with opening 65. The pressure fluid leaves the control valve opening 61 going to the hydraulic motor 26 through pipe 24. The fluid returns to the control valve by pipe 25 into passage 59 and through upper opening 64 into the hollow end of plunger 48 and out through upper opening 65 into the upper section 62 of the passage 47. From there it flows through the passages 47 and 43 to the outlet 37 of the associated relief valve 33 and thence by pipe 29 to the reservoir 17.

When the plunger 48 is in its lower position as viewed in FIG. 2 the lower fork 70 is closed by part 56 and the operation at the top and bottom of the plunger as described above is reversed thereby reversing the direction of rotation of fluid motor 26.

An interlock device (FIGURE 3) on the control and relief valve 23 prevents fluid from the pumps 10 and 13 from being sent to run the motor in opposite directions simultaneously.

The interlock device comprises a flat plate 72, slidably mounted on the control valve 23 and adapted to receive the control rods 51 and 52 through similar slots 73 and 74. The ends of each slot are offset from each other in the direction of the plate movement. The slots restrict the movement of the individual rods from a center position corresponding to the intermediate position of the valve plunger 48 to a setting at the same ends of the slots corresponding to rotating the hydraulic motor in the same direction. With both plungers in center position the plate 72 can be slidably moved by means of knob 75 to permit the control rods to be individually set from the intermediate position to the other ends of their respective slots corresponding to rotating the motor in the reverse direction.

It is understood that the control valve 23 can be actuated manually or automatically by any of the well known means such as by servo mechanism, thermostatic and other controls.

The second pump can alternatively be driven from the fly-wheel 76 instead of the gear box, or one pump could be driven from the fly-wheel and the other from the gear box.

Where it is required to drive the auxiliary equipment when the vehicle is stationary with its engine stopped, provision is made for one or both of the pumps—and preferably one which is coupled to the power take-off of the gear box 16 or to the fly-wheel 76—to be driven by an external source of power such as an electric motor 77. The main shaft of the pump is extended so that it could be coupled to the electric motor 77 and the drive from the power take-off disengaged.

An advantage of the arrangement as above described is that in the event of the failure of one pump it is readily possible to utilize the other one which is completely separate. Also, due to the distribution of the components longitudinally along the chassis, this transmission system is preferable to those which are characterized by a tandem pump arrangement which imposes considerably greater stresses on the front bearings and the couplings. Moreover, because of the short coupling between a crank shaft front flange and a front pump it is possible in many instances to fit the pump to a vehicle without alteration to the radiator grill.

Although the invention has been described with particularity it is understood that this disclosure has been made by way of example, and that many changes in structure and combination could be made within the scope of the invention as hereinafter claimed.

What I claim and desire to secure by Letters Patent is:

1. In combination with a motor vehicle carrying auxiliary equipment requiring power for continual operation and additional power at selected times, a variable speed internal combustion engine mounted in said vehicle and having a flywheel at one end and a crankshaft, a transmission at the flywheel end of said engine for driving said vehicle, a rotary hydraulic motor connected to and driving said auxiliary equipment, a power take-off at the flywheel end of the engine, a high capacity hydraulic pump mounted at the flywheel end of the engine, driving connections coupling said pump with said power take-off, means for selectively uncoupling said pump whereby said pump is driven only at selected times, a lower capacity hydraulic pump mounted at the opposite end of the engine, driving connections coupling said lower capacity pump to the crankshaft of said engine whereby said lower capacity pump is driven continually when said engine is running, a liquid reservoir, means connecting inlets of said pumps to said reservoir and means connecting the outlets of said pumps selectively to said hydraulic motor and connecting said motor to said reservoir, said selective connecting means comprising a common control means for selectively connecting the outlet of the lower capacity pump with said motor for continual operation of said auxiliary equipment and selectively connecting the outlet of said high capacity pump to said motor for supplying greater power to said auxiliary equipment at selected times, said higher capacity pump being uncoupled from the engine when not in service to conserve engine power.

2. A combination according to claim 1, in which said motor is reversible and in which said common control means comprises means for reversing the direction of flow of liquid through said motor and thereby reversing the direction of rotation of said motor.

3. A combination according to claim 2, in which said common control means comprises reversing valve means controlling the flow of liquid from one of said pumps to the motor, reversing valve means controlling the flow of liquid from the other of said pumps to the motor, each of said valve means having a control member movable between a forward position and a reverse position, and means interconnecting said control members to prevent one being moved to reverse position when the other is in forward position.

4. A combination according to claim 2, in which said selective connections comprise a separate line from the outlet of each of said pumps to said common control means, two supply and return lines connecting said control means and said motor and a discharge line connecting said control means with said reservoir, and in which means comprising a relief valve interconnects said supply and return lines and permits flow between said supply and return lines in the event of a pressure surge therein.

5. A combination according to claim 1, further comprising an auxiliary prime mover and means for coupling said high capacity pump to said prime mover to be driven thereby.

References Cited in the file of this patent

UNITED STATES PATENTS

| | | |
|---|---|---|
| 1,182,967 | Bowser | May 16, 1916 |
| 1,932,761 | West | Oct. 31, 1933 |
| 2,009,695 | Iversen et al. | July 30, 1935 |
| 2,103,530 | Henry | Dec. 28, 1937 |
| 2,276,895 | Vosseler et al. | May 17, 1942 |
| 2,323,519 | Dean | July 6, 1943 |
| 2,387,307 | Stone | Oct. 23, 1945 |
| 2,403,935 | Link | July 16, 1946 |
| 2,512,119 | Stone et al. | June 20, 1950 |
| 2,905,191 | Vander Kaay | Sept. 22, 1959 |

FOREIGN PATENTS

| | | |
|---|---|---|
| 556,286 | France | Apr. 11, 1923 |
| 808,846 | Great Britain | Feb. 11, 1959 |